(12) United States Patent
Nagafuchi et al.

(10) Patent No.: US 6,938,950 B2
(45) Date of Patent: Sep. 6, 2005

(54) VEHICLE BODY STRUCTURE

(75) Inventors: Yoshito Nagafuchi, Okazaki (JP); Nobuhiro Oikawa, Okazaki (JP); Katsuhiko Takashina, Okazaki (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 0 days.

(21) Appl. No.: 10/822,215

(22) Filed: Apr. 9, 2004

(65) Prior Publication Data

US 2004/0256890 A1 Dec. 23, 2004

(30) Foreign Application Priority Data

Apr. 9, 2003 (JP) .......................... 2003-105478

(51) Int. Cl.[7] .................. B62D 25/08; B62D 21/15
(52) U.S. Cl. ................. 296/203.02; 296/187.09; 296/193.09
(58) Field of Search .............. 296/187.01, 187.09, 296/187.1, 187.12, 193.05, 193.09, 203.01, 203.02, 203.03

(56) References Cited

U.S. PATENT DOCUMENTS

| | | | | |
|---|---|---|---|---|
| 5,562,329 A | * | 10/1996 | Srock et al. ............ | 296/203.1 |
| 5,586,799 A | * | 12/1996 | Kanemitsu et al. ..... | 296/203.02 |
| 6,179,372 B1 | * | 1/2001 | Sakamoto et al. ...... | 296/203.02 |
| 6,250,710 B1 | * | 6/2001 | Matsuzaki ............. | 296/203.02 |
| 6,364,401 B1 | * | 4/2002 | Kim ...................... | 296/203.02 |
| 6,631,942 B1 | * | 10/2003 | Kitagawa ............... | 296/203.02 |
| 2004/0189055 A1 | * | 9/2004 | Tomita ................... | 296/203.02 |

FOREIGN PATENT DOCUMENTS

JP  3200853 B2  6/2001

* cited by examiner

*Primary Examiner*—Patricia L. Engle
(74) *Attorney, Agent, or Firm*—Rossi, Kimms & McDowell, LLP

(57) ABSTRACT

A vehicle body structure in which a ridge of a front side member is continuous with a ridge of a dash brace to make it possible to efficiently transmit an impact force, and which is capable of realizing an intended deformation of the front side member suited to the impact force, while effectively utilizing a reaction force generated in a side frame member. A front portion of the dash brace is inserted into the front side member through a notch formed in a dash panel, and is overlapped with and spot-welded to a side face of the front side member, whereby the ridge of the front side member is directly continuous with the ridge of the dash brace.

11 Claims, 4 Drawing Sheets

VEHICLE BODY STRUCTURE

CROSS-REFERENCE TO A RELATED APPLICATION

This nonprovisional application claims priority under 35 U.S.C. § 119(a) on Patent Application No. 2003-105478 filed in Japan on Apr. 9, 2003, the entire contents of which are hereby incorporated by reference.

BACKGROUND OF THE INVENTION

1. Field of the Invention

This invention relates to a vehicle body structure, and more particularly, to a mounting structure of a coupling member used to couple a rear portion of a front side member to a side frame member.

2. Description of the Related Art

There have been proposed various vehicle body structures for distributing the impact force, applied to front side members at the time of a front collision of a vehicle, to various portions of the vehicle body to thereby attain an impact-absorbing function. For example, a vehicle body structure has been proposed, in which rear portions of front side members are coupled through dash braces to side frame members such as A-pillars, side sills, or the like, so that the impact force applied to the front side members are distributed to the side frame members (see for example Japanese patent publication no. 3200853).

FIG. 4 is a sectional plan view showing a vehicle body structure disclosed in Japanese patent publication no. 3200853, in which a left side portion of the vehicle body is shown. The engine room R1 of the vehicle is separated from the vehicle compartment R2 by a dash panel 21 whose left end is joined to a side frame member 22. The dash panel 21 has a front face to which is joined a rear end of a front side member 23 having one side thereof coupled to a front end of a side member 24 fixed beneath the vehicle floor.

Also joined to the front face of the dash panel 21 is a dash cross member 25 which cooperates with the dash panel to form a closed cross-section and through which the rear ends of the left and right front side members 23 are coupled to each other. Further, a dash brace 26 is provided, which is joined to the rear face of the dash panel 21 so as to form a closed cross-section in cooperation with the dash panel and through which the rear end of the front side member 23 is coupled to the side frame member 22.

At the time of a front collision of the vehicle, the impact force applied to the front side members 23 from front is transmitted to the side members 24 and to the dash cross members 25, and also to the side frame members 22 through the dash braces 26. In this manner, the impact force is distributed to various portions on the side of the vehicle compartment R2, and the front side members 23 are deformed from their front ends, utilizing reaction forces generated in the various portions, whereby an impact-absorbing function is attained.

As apparent from FIG. 4, however, the dash brace 26 having such arrangement and shape as disclosed in Japanese patent publication no. 3200853 forms a ridge L22 which is independent of and is not directly continuous with a ridge L21 of the front side member. As well known, the impact force is mainly transmitted through the ridge L21 of the front side member 23 and the ridge L22 of the dash brace 26. In a case where the ridge L21 is discontinuous with the ridge L22, therefore, a deformation is caused at the discontinuous portion, so that the impact force cannot efficiently be transmitted from the front side member 23 to the dash brace and to the side frame member 22. As a result, a sufficient impact-absorbing function cannot be realized utilizing the reaction force generated in the side frame member 22.

SUMMARY OF THE INVENTION

An object of this invention is to provide a vehicle body structure in which a ridge of a front side member is made continuous with a ridge of a dash brace so that the impact force is efficiently transmitted, thereby effectively utilizing a reaction force produced in a side frame member to attain an intended deformation of the front member suited to the impact force.

According to the present invention, there is provided a vehicle body structure which comprises: a front side member extending in a longitudinal direction of the vehicle body; a side frame member provided rearwardly and laterally of the front side member; and a coupling member through which the front side member is coupled to the side frame member, wherein a coupled face including at least one ridge is formed in a rear portion of the front side member; a front portion of the coupling member is extended along the coupled face; and a coupling face including at least one ridge is formed in the extended portion so as to be in face-contact with and to be joined to the coupled face of the front side member.

Since the coupled face is in face-contact with the coupling face, the ridge contained in the coupled face is directly continuous with the ridge contained in the coupling face. For this reason, the impact force applied to the front side member at the time of a collision of the vehicle is effectively transmitted through these ridges to a dash brace and to the side frame member, whereby a reaction force produced in the side frame member is effectively utilized to achieve an intended deformation of the front side member suited to the impact force.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

In the following, a vehicle body structure for embodying the present invention will be explained.

Figure 1:
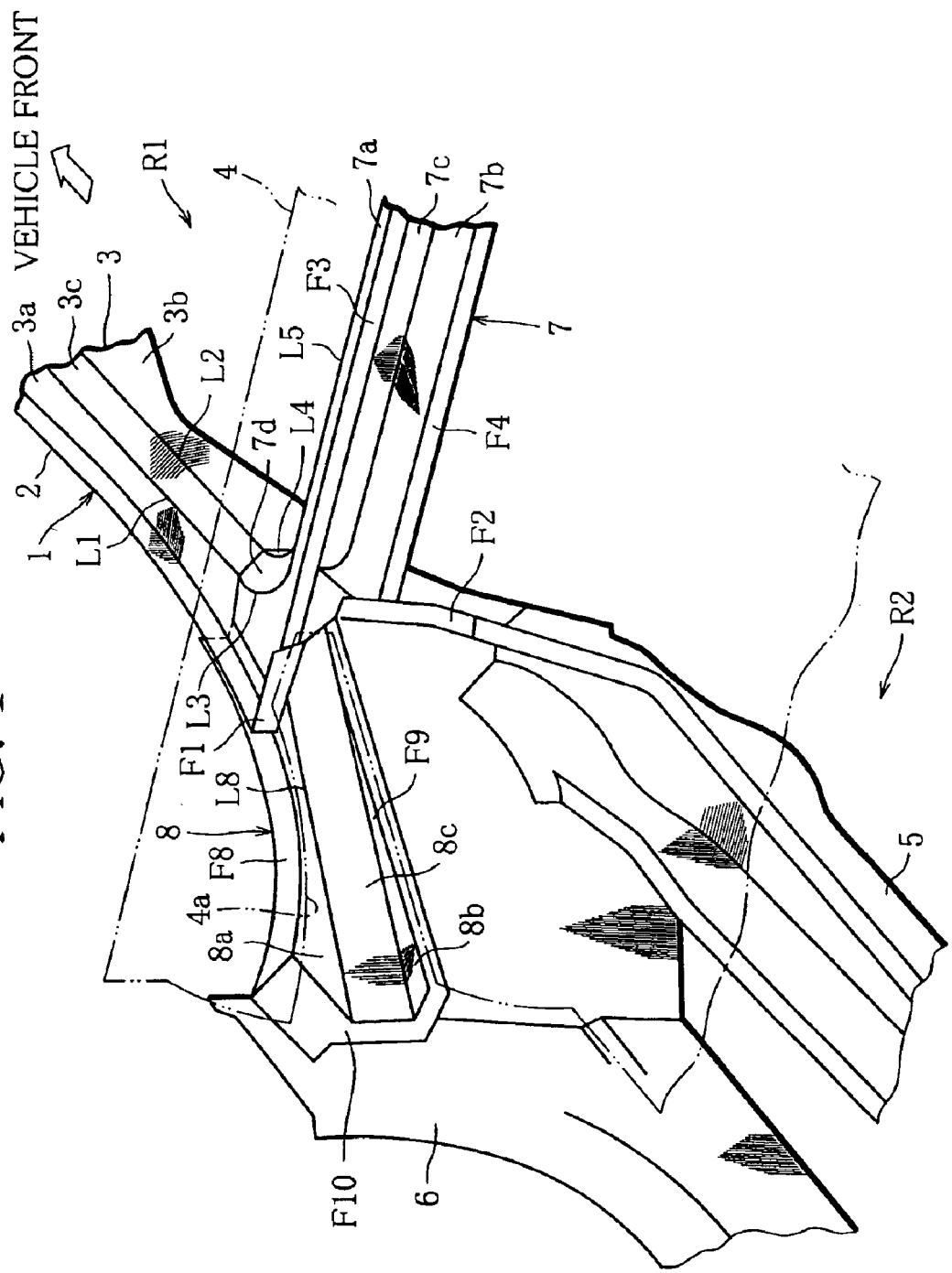
FIG. 1 is a perspective view of a vehicle body structure according to an embodiment of this invention seen from within the vehicle compartment.
Figure 2:
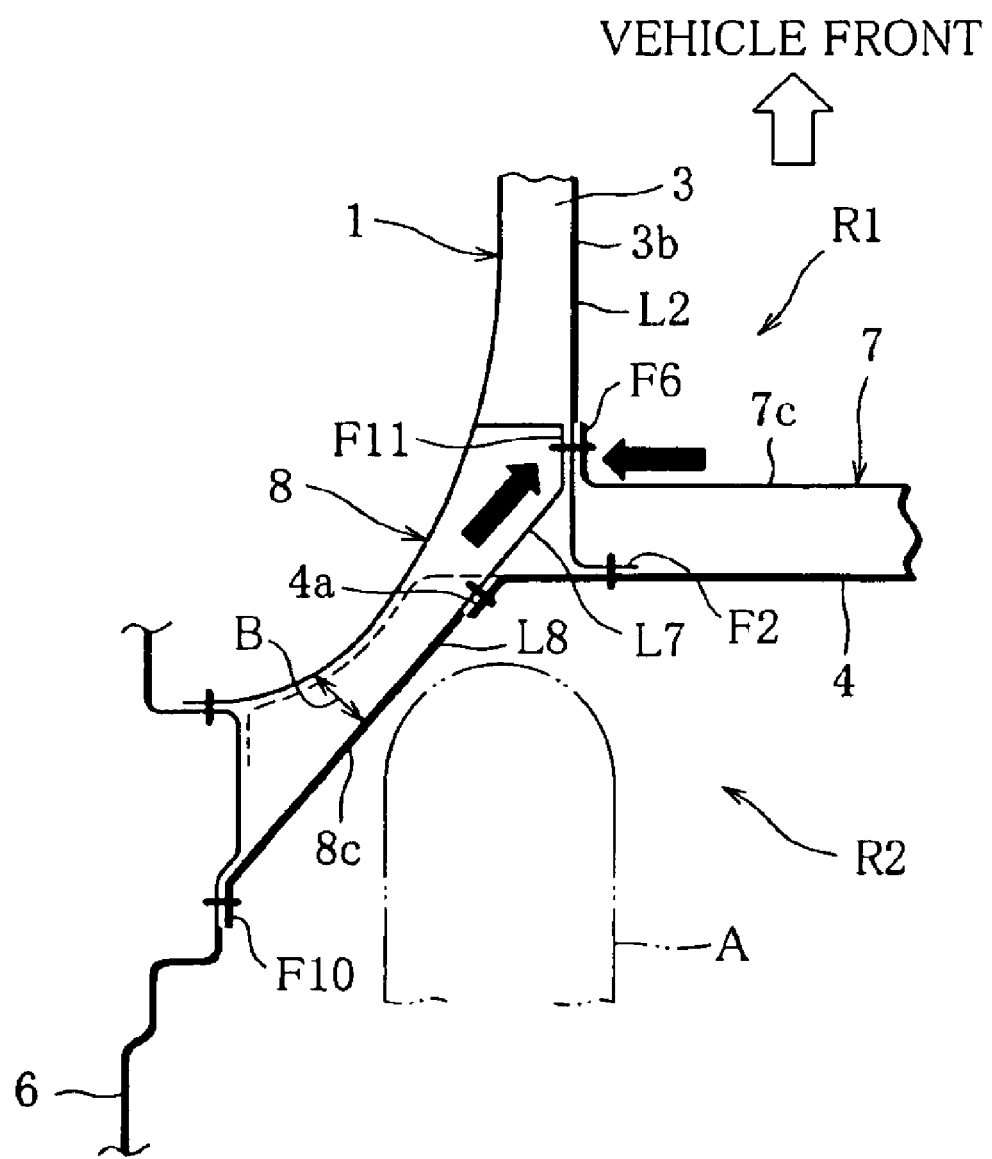
FIG. 2 is a sectional plan view of the vehicle body structure.
Figure 3:
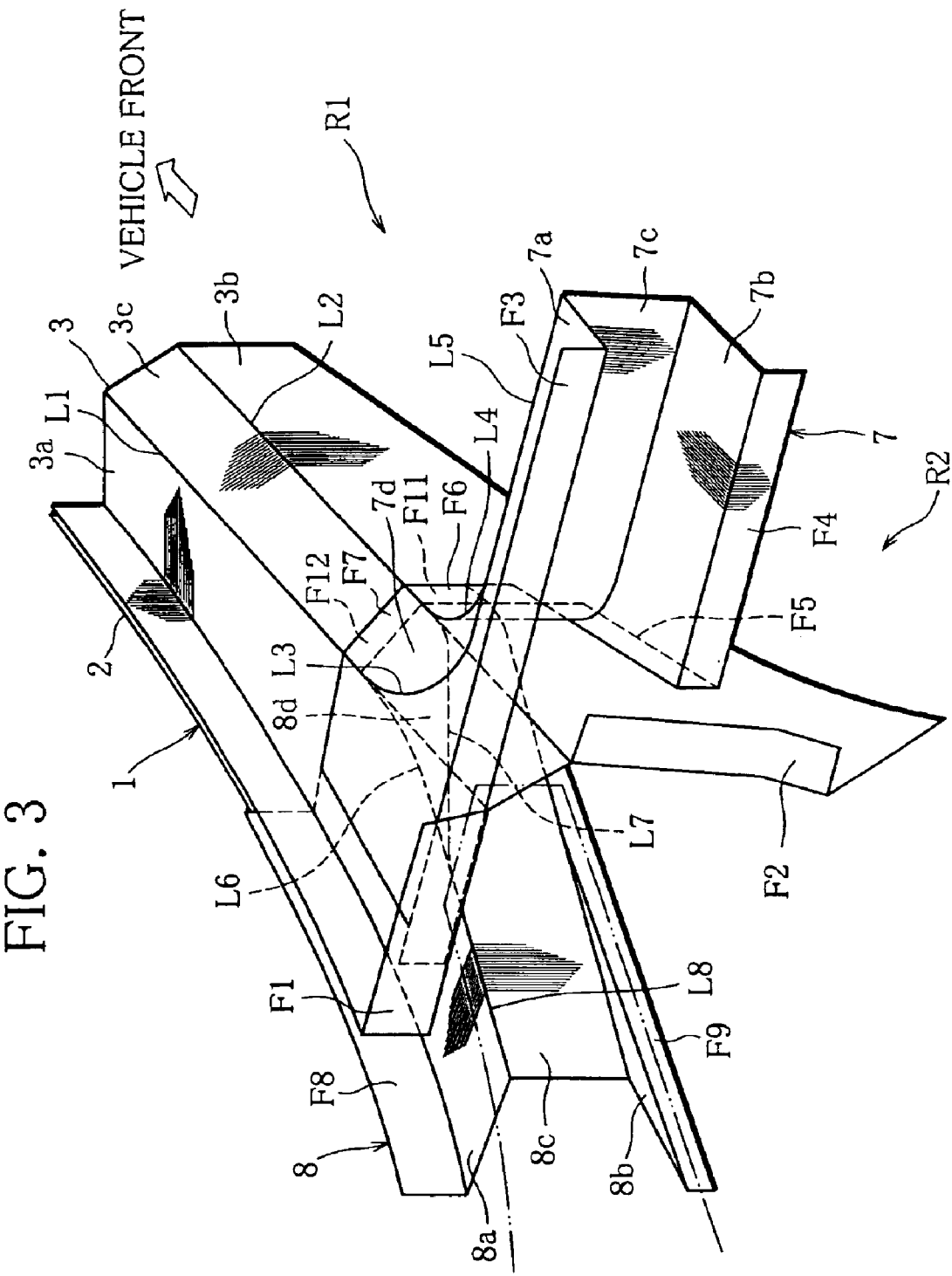
FIG. 3 is an enlarged view showing an essential part of the vehicle body structure shown in FIG. 1.

In FIGS. 1–3, a left side portion of a vehicle body is shown. The vehicle body has its right side portion which is the same in construction as the left side portion. A pair of front side members 1 are disposed at the front of the vehicle body so as to be spaced at a predetermined distance in the width direction (referred to also as the left and right direction) of the vehicle. The front side members 1, each constituted by an outer panel 2 and an inner panel 3 that are joined to each other to form a closed cross-sectional structure, extend longitudinally on the left and right sides of the engine room R1, respectively. The inner panel 3 has an upper face 3a and a side face 3b between which a slanted intermediate face 3c is formed longitudinally over the entire length of the inner panel. Thus, ridges L1 and L2 extending in the longitudinal direction are formed between the upper and intermediate faces 3a, 3c and between the intermediate and side faces 3c, 3b, respectively.

Rear ends of the left and right front side members 1 extend to a dash panel 4 by which the engine room R1 is separated from the vehicle compartment R2. The inner panel 3 of the front side member 1 is formed at its rear end with flanges F1, F2 respectively corresponding to the upper and side faces 3a, 3b. These flanges F1, F2 are spot-welded to a front face of the dash panel 4. The rear end of the inner panel 3 has one side thereof extended downward along the dash panel 4 and coupled to the front end of the side member 5 that is fixed to a lower face of the floor of the vehicle body. The rear end of the outer panel 2 is extended along the front face of the dash panel 4 so as to be curved toward outside of the vehicle body to thereby form a tire housing face for the front wheel, and is coupled to a front portion of a side frame member 6 such as an A-pillar or a side sill which are disposed either side of the vehicle body.

A dash cross member 7 is disposed at the front face of the dash panel 4, and has an upper, lower and side faces 7a–7c that are as a whole formed into a U-shape in cross section which opens rearward. Flanges F3, F4 are formed in the upper and lower faces 7a, 7b of the dash cross member 7 which is spot-welded through the flanges F3, F4 to the front face of the dash panel 4, whereby a closed cross-section is formed by the dash cross member 7 and the dash panel 4.

At the left and right ends of the dash cross member 7, the upper face 7a is more extended toward outside of the vehicle body than the lower and side faces 7b, 7c. The extended portion of the upper face 7a overlaps the upper face 3a of the inner panel 3 and is spot-welded thereto. Each of the left and right upper flanges F3 formed on the dash cross member 7 has an end thereof overlapped with and spot-welded to the flange F1 formed on the inner panel 3. Flanges F5 bent downward are formed at left and right ends of the lower face 7b of the dash cross member 7, and are each overlapped with and spot-welded to the side face 3b of the inner panel 3 concerned.

The side face 7c of the dash cross member 7 has its left and right ends curved forward, and a front end of each curved portion is overlapped with and spot-welded to the side face 3b of the inner panel 3 concerned. At the left and right ends of the dash cross member 7, a triangular intermediate face 7d is formed between the upper and side faces 7a, 7c and is curved forward following the curved shape of the side face 7c. A front end of the curved portion, serving as a flange F7, is overlapped with and spot-welded to the intermediate face 3 of the inner panel 3.

With the above-described construction, the both ends of the dash cross member 7 are coupled to the left and right front side members 1, respectively. The ridge L1 between the upper and intermediate faces 3a, 3c of the front side member 1 is continuous with a ridge L3 between the intermediate and side faces 7c, 7b of the dash cross member 7, and the ridge L2 between the intermediate and side faces 3c, 3b of the front side member 1 is continuous with a ridge L4 between the intermediate and side faces 7d, 7c of the dash cross member 7. These ridges L3, L4 are joined into one on the dash cross member 7 along the triangular intermediate face 7d, and become in continuous with a ridge L5 between the upper face 7a and the side face 7c.

At the rear of the outer panel 2 of the front side member 1, a dash brace 8 is disposed along a face of the outer panel on the side close to the vehicle compartment R2 (on the side remote from the tier housing). The dash brace 8 is horizontally disposed so as to couple the rear end of the inner panel 3 of the front side member 1 to the front portion of the side frame member 6. The upper, lower and side faces 8a–8c of the dash brace 8 are formed into a U-shape in cross section which opens to the outer panel 2. Flanges F8, F9 individually formed above and below the dash brace 8 are overlapped with and spot-welded to the outer panel 2, and a flange F10 formed in the rear of the dash brace 8 is overlapped with and spot-welded to the front of the side frame member 6, whereby a closed cross-section is defined by the outer panel 2 and the dash brace 8.

As shown in FIG. 3, the front portion of the dash brace 8 is extended and inserted into the closed cross-section of the front side member 1. The dash panel 4 is formed with a notch 4a so as to correspond to the dash brace 8. The dash brace 8 is exposed through the notch 4a to within the vehicle compartment R2, and, as mentioned above, the front portion of the dash brace 8 is inserted into the front side member 1 through the notch 4a.

In the front side member 1, the front portion of the upper face 8a of the dash brace 8 is overlapped, from inside, with and spot-welded to the upper face 3a of the inner panel 3. The front portion of the side face 8c of the dash brace 8 is curved forwardly along the side face 3b of the inner panel 3, and the front end of the curved portion serving as a flange F11 is overlapped, from inside, with and spot-welded to the side face 3b of the inner panel 3.

At the front portion of the dash brace 8, a triangular intermediate face 8 is formed between the upper face 8a and the side face 8c, and is curved forwardly following the curved shape of the side face 8c. The front end of the curved portion serving as a flange F12 is overlapped, from inside, with and spot-welded to the intermediate face 3c of the inner panel 3.

With the above-described construction, the front end of the dash brace 8 is coupled to the front side member 1. The ridge L1 between the upper and intermediate faces 3a, 3c of the front side member 1 is continuous with the ridge L6 between the upper and intermediate faces 8a, 8d of the dash brace 8, and the ridge L2 between the intermediate and side faces 3c, 3b of the front side member 1 is continuous with the ridge L7 between the intermediate and side faces 8d, 8c of the dash brace 8. These ridges L6 and L7 are joined into one on the dash brace 8 along the triangular intermediate face 8d, and become continuous with the ridge L8 between the upper face 8a and the side face 8c.

That is, in this embodiment, the upper, side and intermediate faces 3a–3c of the front side member serve as the coupled face including the ridges L1, L2, and the flange F11 formed on the front portion of the upper face 8a of the dash brace 8 and the side face 8c thereof cooperates with the flange F12 formed on the intermediate face 8d to serve as the coupling face including the ridges L6, L7.

Further, the front portion of the upper face 8a of the dash brace 8 overlaps a corresponding one of the left and right ends of the upper face 7a of the dash cross member 7, the flange F11 on the side face 8c of the dash brace 8 overlaps a flange F6 on the side face 7c of the dash cross member 7, and the flange F12 on the intermediate face 8d of the dash brace 8 overlaps the flange F7 on the intermediate face 7d of the dash cross member 7, with the inner panel 3 sandwiched therebetween. The front portion of the upper face 8a and the flanges F11, F12 are simultaneously spot-welded, with the inner panel 3 sandwiched.

That is, in this embodiment, the flanges F6 formed on the left and right ends of the upper face 7a and on the side face 7c of the dash cross member 7 each cooperate with the flange F7 formed on the intermediate face 7d to serve as a fixture face.

Next, how the impact force is distributed in the vehicle body structure constructed as mentioned above will be explained in detail. Prior to such explanations, the arrangement of respective members, in particular, the angular setting of the dash brace 8 and the positional relation between the dash brace 8 and the knee A of a passenger will be explained.

The dash brace 8 is requested to be disposed at an angle as close as possible to the longitudinal direction of the vehicle from the viewpoint of effective transmission of the impact force, whereas the projection of the dash brace 8 should be suppressed as small as possible from the viewpoint of preventing the interference between the dash brace 8 and the knee A of the passenger.

Figure 4:
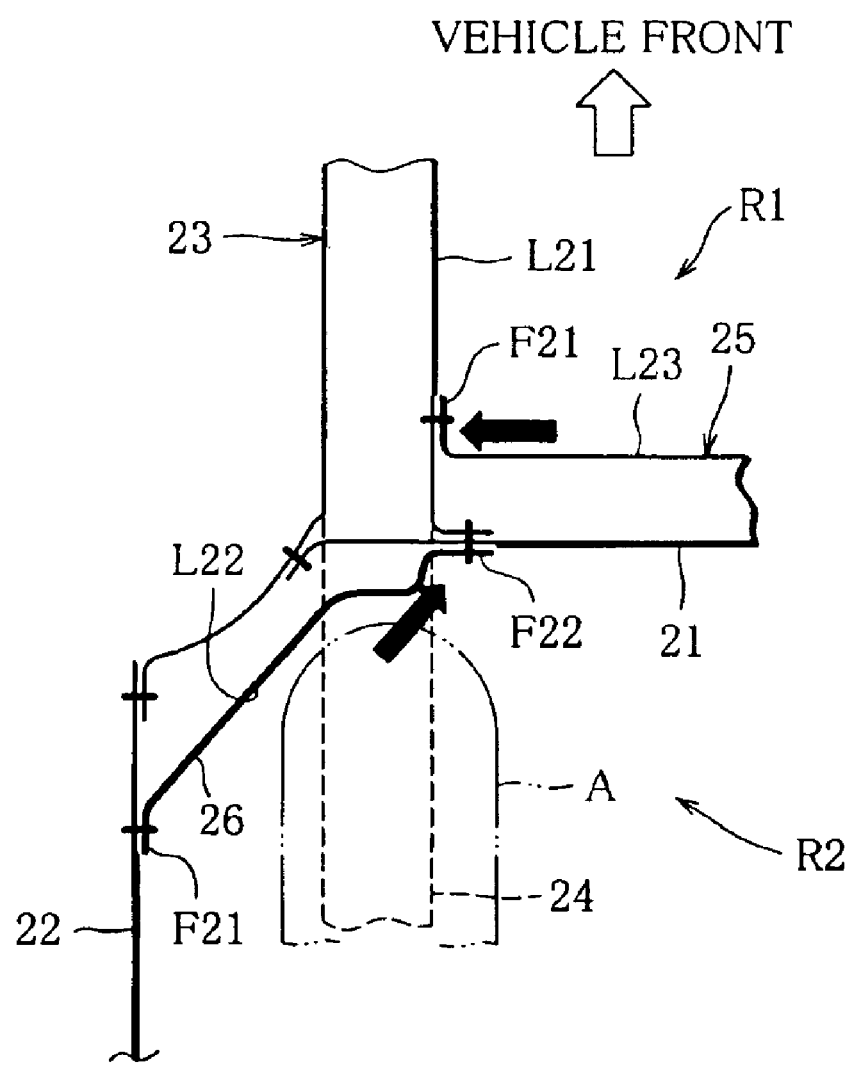
FIG. 4 is a sectional plan view showing a prior art vehicle body structure.

In this embodiment, the front portion of the dash brace 8 is inserted into the front side member 1, and the upper, side and intermediate faces 8a, 8c and 8d of the dash brace 8 are then overlapped (in face-contact) with and joined to the upper, side and intermediate faces 3a–3c of the inner panel 3, respectively. Therefore, as compared to the prior art shown in FIG. 4 in which the dash brace 26 is coupled to the rear end of the front side member 23, the front portion of the dash brace 8 is positioned nearer to the vehicle front, as apparent from FIGS. 2 and 3. Thus, the dash brace 8 can be disposed at an angle that is preferable from the viewpoint of the proper impact-force transmission, e.g., at an angle of about 45 degrees with respect to the longitudinal direction as seen from above, while ensuring a space in front of the passenger in the vehicle compartment R2, without the need of the surface of the dash brace 26 being curved to outside of the vehicle body as in the prior art.

At the time of a front collision of the vehicle, the impact force applied to the front side members 1 acts so as to compress the front side members 1 in the longitudinal direction. The impact force is transmitted from the rear portion of the front side members 1 to the side members and to the dash cross member 7 that are disposed on the lower face of the floor, and is also transmitted to the side frame members 6 through the dash braces 8.

To be noted, as a result of the aforementioned coupling between the front side member 1 and the dash brace 8, the ridges L1, L2 of the front side member 1 are directly continuous with the ridges L6–L8 of the dash brace 8, respectively. Hence, the impact force from the front side member 1 is efficiently transmitted through the ridges L1, L2 and L6–L8 to the dash brace 8 and to the side frame member 6, whereby the reaction force produced in the side frame member 6 can be utilized efficiently. As a consequence, an intended modification of the front side member 1 suited to the impact force can be realized, without causing a large deformation of unexpected portion such as the connection between the front side member 1 and the dash brace 8.

As a result, only the front ends of the front side members 1 are deformed at the time of a collision at low speeds, whereby area portions requiring repair can be reduced, resulting in reduction in repairing costs. On the other hand, at the time of a collision at high speeds, the front side members 1 can adequately be deformed to maximize the impact-absorbing function, whereby the deformation of the vehicle compartment R2 can securely be suppressed.

As mentioned above, the front portion of the upper face 8a of the dash brace 8 overlaps the flanges F11, F12, and the left and right ends of the upper face 7a of the dash cross member 7 overlap the flanges F6, F7. In other words, the dash brace 8 and the dash cross member 7 are coupled at a common area to the front side member 1. Thus, the impact force from the front side member 1 is transmitted through the common coupling (i.e., the overlapping portions) to the dash brace 8 and to the dash cross member 7, whereby more efficient transmission of the impact force can be achieved as compared to a case where the impact-force transmitting point is different between for the dash brace 26 and for the dash cross member 25 as in the prior art shown in FIG. 4. As a consequence, the impact-absorbing function can be further enhanced effectively utilizing, through the dash braces 8 and the dash cross member 7, the reaction forces generated in the side frame members 6 and the engine room R1.

As shown by arrows in FIG. 2, the reaction force from the dash brace 8 collides with the reaction force from the dash cross member 7 at a predetermined angle (corresponding to an angle formed between the dash brace 8 and the dash cross member 7) at the common coupling on the front side member 1, so that these reaction forces will be canceled out from each other, whereby the deformation at the coupling point due to the reaction forces, and by extension the deformation of the engine room R1, can be suppressed.

Furthermore, the front portion of the dash brace 8 extends through the notch 4a formed in the dash panel 4 and is coupled to the front side member 1, so that the dash brace 8 per se is exploded through the notch 4a to within the vehicle compartment R2. Thus, the dash panel 4 is positioned more outside of the vehicle body by the dimension of B as shown by the dotted line in FIG. 2, as compared to a case where the notch 4a is not formed and the entire of the dash brace 8 is covered by the dash panel 4 seen from the inside of the vehicle compartment R2. With this arrangement, a reduction in the vehicle compartment space due to the provision of the dash brace 8 can advantageously be suppressed.

In the above, the embodiment has been explained. The present invention is not limited to this embodiment. For instance, in the embodiment, the dash brace 8 and the dash cross member 7 are coupled at a common place to the front side member 1. However, this is not essentially required. Both the members 8 and 7 may be coupled to the front side member 1 at positions which are deviated from each other in the longitudinal direction.

In the embodiment, the front portion of the dash brace 8 is inserted into the front side member 1 and the upper face 8a thereof and the flanges F11, F12 are overlapped with the upper face 7a of the dash cross member 7 and the flanges F6, F7. Alternatively, the front portion of the dash brace 8 may be fitted on the rear portion of the front side member and may be directly joined to the dash cross member 7.

In the embodiment, the dash cross member 7 and the dash brace 8 are formed with the intermediate faces 7d, 8d, respectively, so as to be continuous through the respective two ridges L3, L4; L6, L7 with the ridges L1, L2 of the front side member. However, the number of the ridges is not limited thereto. For example, the intermediate face 3c of the front side member 1 may be omitted so as to reduce the number of the ridges to one, and the corresponding intermediate faces 7d, 8d of the dash cross member 7 and the dash brace 8 may be omitted to obtain a respective one ridge L5, L8, so that each ridge is continuous with a corresponding ridge.

In the foregoing embodiment, the dash brace 8 is exposed to within the vehicle compartment R2 through the notch 4a formed in the dash panel 4, but it is not essentially required to form the notch 4a in the dash panel 4. For example, the entire of the dash brace 8 may be covered by the dash panel 4 seen from the inside of the vehicle compartment R2, without forming the notch 4a.

What is claimed is:

1. A vehicle body structure comprising:
a front side member extending in a longitudinal direction of a vehicle body;
a side frame member provided rearwardly and laterally of said front side member; and
a coupling member through which said front side member is coupled to said side frame member,
wherein a coupled face including at least one ridge is formed in a rear portion of said front side member,
wherein said coupling member has a front portion extending along the coupled face,
wherein the front portion that extends along the coupled face has a coupling face including at least one ridge so as to be in face-contact with and to be joined to the coupled face of said front side member,
wherein the rear portion of said front side member is joined to a dash panel of the vehicle body, the dash panel being formed with a notch, and
wherein said coupling member extends from said side frame member through the notch, and is coupled to said front side member.

2. A vehicle body structure comprising:
a front side member extending in a longitudinal direction of a vehicle body;
a side frame member provided rearwardly and laterally of said front side member; and
a coupling member through which said front side member is coupled to said side frame member,
wherein a coupled face including at least one ridge is formed in a rear portion of said front side member,
wherein said coupling member has a front portion extending along the coupled face,
wherein the front portion that extends along the coupled face has a coupling face including at least one ridge so as to be in face-contact with and to be joined to the coupled face of said front side member,
wherein said front side member is formed to have a closed cross-section, and
wherein said coupling member is inserted into the closed cross-section of said front side member.

3. The vehicle body structure according to claim 2, wherein:
said front side member is formed by an outer panel and an inner panel that are joined to each other,
said coupling member is formed into a U-shape in cross section which opens to said outer panel, and is joined to the outer panel, and
said outer panel cooperates with said coupling member to form a closed cross-section.

4. A vehicle body structure comprising:
a front side member extending in a longitudinal direction of a vehicle body;
a side frame member provided rearwardly and laterally of said front side member; and
a coupling member through which said front side member is coupled to said side frame member,
wherein a coupled face including at least one ridge is formed in a rear portion of said front side member,
wherein said coupling member has a front portion extending along the coupled face,
wherein the front portion that extends along the coupled face has a coupling face including at least one ridge so as to be in face-contact with and to be joined to the coupled face of said front side member,
wherein the coupled face of said front side member has an upper face, an intermediate face, and a side face, a first ridge being formed between the upper face and the intermediate face and a second ridge being formed between the intermediate face and the side face,
wherein the coupling face of said coupling member has an upper face, an intermediate face, and a side face, a third ridge being formed between the upper face and the intermediate face and a fourth ridge being formed between the intermediate face and the side face, and
wherein the first ridge is continuous with the third ridge, and the second ridge is continuous with the fourth ridge.

5. The vehicle body structure according to claim 4, wherein the third and fourth ridges are joined to one on a rear side of the vehicle body.

6. A vehicle body structure comprising:
a dash panel provided at a front portion of the vehicle body;
a front side member extending in a longitudinal direction of the vehicle body while forming a closed cross-sectional structure, and having a rear portion thereof joined to said dash panel;
a cross member extending along said dash panel in a width direction of the vehicle body, and having an end portion thereof formed with a fixture face that is joined to the rear portion of said front side member;
a side frame member provided rearwardly and laterally of said front side member; and
a coupling member through which said front side member is coupled to said side frame member,
wherein a coupled face including at least one ridge is formed in the rear portion of said front side member,
wherein said coupling member has a front portion extending along the coupled face,
wherein the front portion that extends along the coupled face has a coupling face including at least one ridge,
wherein the coupling face is in face-contact with and joined to the coupled face of said front side member so as to overlap the fixture face of said cross member,
wherein a notch is formed in said dash panel, and said coupling member extends from said side frame member through the notch toward said front side member.

7. The vehicle body structure according to claim 6, wherein said cross member has left and right ends thereof that are curved forwardly, and a front end of the curved portion is joined to said front side member.

8. A vehicle body structure comprising:
a dash panel provided at a front portion of the vehicle body;
a front side member extending in a longitudinal direction of the vehicle body while forming a closed cross-sectional structure, and having a rear portion thereof joined to said dash panel;

a cross member extending along said dash panel in a width direction of the vehicle body, and having an end portion thereof formed with a fixture face that is joined to the rear portion of said front side member;

a side frame member provided rearwardly and laterally of said front side member; and a coupling member through which said front side member is coupled to said side frame member, wherein a coupled face including at least one ridge is formed in the rear portion of said front side member, wherein said coupling member has a front portion extending along the coupled face, wherein the front portion that extends along the coupled face has a coupling face including at least one ridge, wherein the coupling face is in face-contact with and joined to the coupled face of said front side member so as to overlap the fixture face of said cross member, wherein a flange extending upward is formed in a rear end of said front side member, and a flange extending upward is formed in an upper face of said cross member and is overlapped with and joined to the flange of said front side member.

9. A vehicle body structure comprising:

a dash panel provided at a front portion of the vehicle body;

a front side member extending in a longitudinal direction of the vehicle body while forming a closed cross-sectional structure, and having a rear portion thereof joined to said dash panel;

a cross member extending along said dash panel in a width direction of the vehicle body, and having an end portion thereof formed with a fixture face that is joined to the rear portion of said front side member;

a side frame member provided rearwardly and laterally of said front side member; and a coupling member through which said front side member is coupled to said side frame member, wherein a coupled face including at least one ridge is formed in the rear portion of said front side member, wherein said coupling member has a front portion extending along the coupled face, wherein the front portion that extends along the coupled face has a coupling face including at least one ridge, wherein the coupling face is in face-contact with and joined to the coupled face of said front side member so as to overlap the fixture face of said cross member, wherein the coupled face of said front side member has an upper face, an intermediate face, and a side face, a first ridge being formed between the upper face and the intermediate face and a second ridge being formed between the intermediate face and the side face, wherein the fixture face of said cross member has an upper face, an intermediate face, and a side face, a fifth ridge being formed between the upper face and the intermediate face and a sixth ridge being formed between the intermediate face and the side face, wherein the first ridge is continuous with the fifth ridge, and the second ridge is continuous with the sixth ridge.

10. The vehicle body structure according to claim 9, wherein the fifth and sixth ridges are joined into one on a rear side of the vehicle body.

11. The vehicle body structure according to claim 10, wherein:

the coupling face of said coupling member has an upper face, an intermediate face, and a side face, a third ridge being formed between the upper face and the intermediate face, and a fourth ridge being formed between the intermediate face and the side face; and the first and third ridges are continuous with the fifth ridge, and the second and fourth ridges are continuous with the sixth ridge.

* * * * *